(12) United States Patent
Van Neer et al.

(10) Patent No.: US 12,459,003 B2
(45) Date of Patent: Nov. 4, 2025

(54) ULTRASONIC TRANSDUCER WITH STACKED MEMBRANES

(71) Applicant: Nederlandse Organisatie voor toegepast-natuurwetenschappelijk onderzoek TNO, 's-Gravenhage (NL)

(72) Inventors: Paul Louis Maria Joseph Van Neer, Bergschenhoek (NL); Arno Willem Frederik Volker, Delft (NL); Gerwin Hermanus Gelinck, Valkenswaard (NL); Hylke Broer Akkerman, Rosmalen (NL); Antonius Maria Bernardus Van Mol, Veldhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 764 days.

(21) Appl. No.: 17/796,467

(22) PCT Filed: Feb. 2, 2021

(86) PCT No.: PCT/NL2021/050063
§ 371 (c)(1),
(2) Date: Jul. 29, 2022

(87) PCT Pub. No.: WO2021/158101
PCT Pub. Date: Aug. 12, 2021

(65) Prior Publication Data
US 2023/0347381 A1    Nov. 2, 2023

(30) Foreign Application Priority Data
Feb. 3, 2020   (EP) .................................... 20155216

(51) Int. Cl.
*B06B 1/06*   (2006.01)
*B06B 1/02*   (2006.01)

(52) U.S. Cl.
CPC .......... *B06B 1/0611* (2013.01); *B06B 1/0215* (2013.01); *B06B 1/0292* (2013.01);
(Continued)

(58) Field of Classification Search
CPC ... B06B 1/0611; B06B 1/0215; B06B 1/0292; B06B 2201/20; B06B 2201/51; B06B 2201/55
See application file for complete search history.

(56) References Cited

U.S. PATENT DOCUMENTS 6,328,697 B1   12/2001   Faser
2009/0140609 A1   6/2009   Huang
(Continued)

FOREIGN PATENT DOCUMENTS

CN   102333485 A   1/2012
EP   4051441   9/2022
(Continued)

OTHER PUBLICATIONS

Machine translation of JP WO 2014174730 (Year: 2017).*
(Continued)

*Primary Examiner* — Bumsuk Won
(74) *Attorney, Agent, or Firm* — Leydig, Voit & Mayer, Ltd.

(57) ABSTRACT

An ultrasonic transducer is described that includes a stack of at least two membranes attached to a substrate. An electric circuit is coupled to the electrodes with a controller configured to apply a first electric signal to a first electrode on the first membrane, and a different, second electric signal to a second electrode on the second membrane. The first and second electric signals are configured to apply a varying voltage between the first electrode and the second electrode during a respective vibration cycle of the membranes. The first electrode on the first membrane is configured to interact (Continued)

with the second electrode on the second membrane by a varying electrostatic force during the respective vibration cycle depending on the varying voltage.

20 Claims, 7 Drawing Sheets

(52) U.S. Cl.
CPC ....... *B06B 2201/20* (2013.01); *B06B 2201/51* (2013.01); *B06B 2201/55* (2013.01)

(56) References Cited

U.S. PATENT DOCUMENTS

| | | | |
|---|---|---|---|
| 2015/0230010 A1 | 8/2015 | Suvanto et al. | |
| 2016/0016198 A1* | 1/2016 | Emadi | A61B 8/4483 310/309 |
| 2018/0029076 A1 | 2/2018 | Van Rens | |
| 2019/0121460 A1* | 4/2019 | Ting | G06F 3/016 |
| 2019/0255568 A1* | 8/2019 | Kojima | H10N 30/082 |
| 2019/0366382 A1* | 12/2019 | Akiyama | B06B 1/0215 |

FOREIGN PATENT DOCUMENTS

| | | | | |
|---|---|---|---|---|
| JP | H01235389 A | 9/1989 | | |
| JP | 2006262092 A | 9/2006 | | |
| JP | 2007229328 A | 9/2007 | | |
| JP | 2008199342 A | 8/2008 | | |
| JP | WO2014174730 A1 * | 2/2017 | ............. | G10K 9/125 |
| JP | 6390428 B2 | 9/2018 | | |
| WO | WO-2014103334 A1 * | 7/2014 | ............ | B06B 1/0292 |
| WO | 2014134723 A1 | 9/2014 | | |
| WO | 2013018579 A1 | 3/2015 | | |
| WO | 2019038242 A1 | 2/2019 | | |
| WO | WO 2021/086184 A1 | 5/2021 | | |

OTHER PUBLICATIONS

China National Intellectual Property Administration, Notice to Grant Patent Right in corresponding Chinese Patent Application No. 202180015835.2 dated Jul. 21, 2025.

Japanese Patent Office, Office Action in corresponding Japanese Patent Application No. 2022-543792 drafted on Jan. 22, 2025, mailed on Jan. 28, 2025.

China National Intellectual Property Administration, Office Action in corresponding Chinese Application No. 202180015835.2 dated Jan. 16, 2025.

European Patent Office, International Search Report in corresponding International Application No. PCT/NL2021/050063, dated Apr. 30, 2021 (2 pages).

European Patent Office, Office Action in corresponding European Application No. 21703563.3, dated Sep. 14, 2023 (4 pages).

* cited by examiner

ULTRASONIC TRANSDUCER WITH STACKED MEMBRANES

CROSS-REFERENCE TO RELATED APPLICATIONS

This patent application is a U.S. National Phase of PCT International Application No. PCT/NL2021/050063, filed Feb. 2, 2021, which claims priority to European Application No. 20155216.3, filed Feb. 3, 2020, which are both expressly incorporated by reference in their entireties, including any references contained therein.

TECHNICAL FIELD AND BACKGROUND

The present disclosure relates to an ultrasonic transducer and method of control.

Ultrasonic transducers, e.g. sources and/or receivers, have various applications such as medical imaging, flow meters, et cetera. Membranes can be actuated by various mechanisms. For example, actuation can be effected by a piezoelectric transducer coupled to the membrane. Depending on the electrical signal, the piezoelectric material may expand or contract which can result in vibration of the membrane. To increase a vibration amplitude, the actuation signal may be matched to a resonance frequency of the membrane. Alternatively or additionally, an amplitude of the electrical signal can be increased. However there may be limits, e.g. maximum voltage, before the actuation mechanism gets damaged. Also the transfer of force to effect the vibration may be suboptimal.

There remains a need for improving power and efficiency in membrane based transducers.

SUMMARY

Aspects of the present disclosure relate to an ultrasonic transducer and method of control. The transducer comprises a stack of at least two membranes attached to a (common) substrate. An electric circuit coupled to the electrodes configured to apply a first electric signal to a first electrode on the first membrane, and a different, second electric signal to a second electrode on the second membrane. The first and second electric signals are configured to apply a varying voltage between the first electrode and the second electrode during a respective vibration cycle of the membranes at an ultrasonic frequency. The first electrode on the first membrane is configured to interact with the second electrode on the second membrane by a varying electrostatic force during the respective vibration cycle depending on the varying voltage. As described herein, the dynamic variation of voltage electrostatic force between the membranes during a respective vibration cycle can be used to enhance vibration in at least one of the membranes leading to higher amplitude or power. For example, power can be enhanced in a stack of piezoelectric membranes. In some embodiments, asymmetry in the displacement, may also improve bandwidth.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
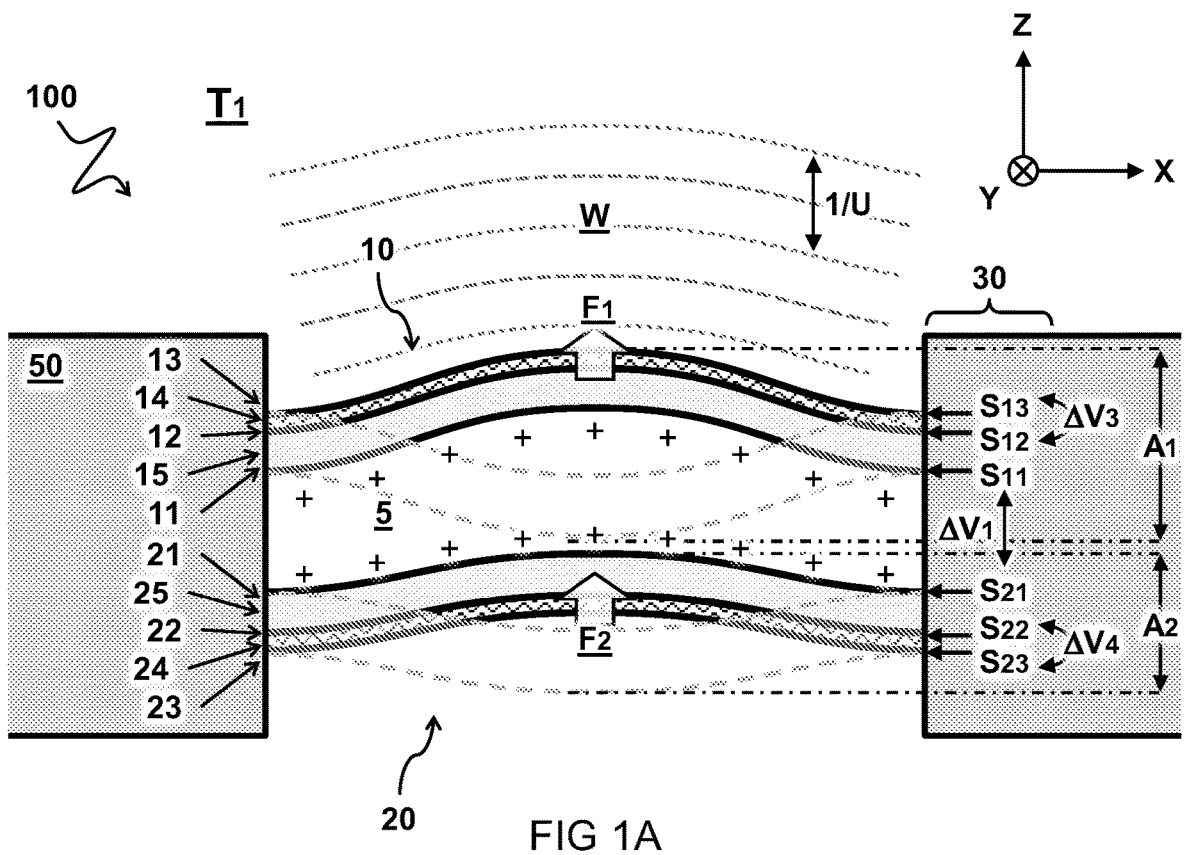
FIGS. 1A and 1B illustrate an ultrasonic transducer.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
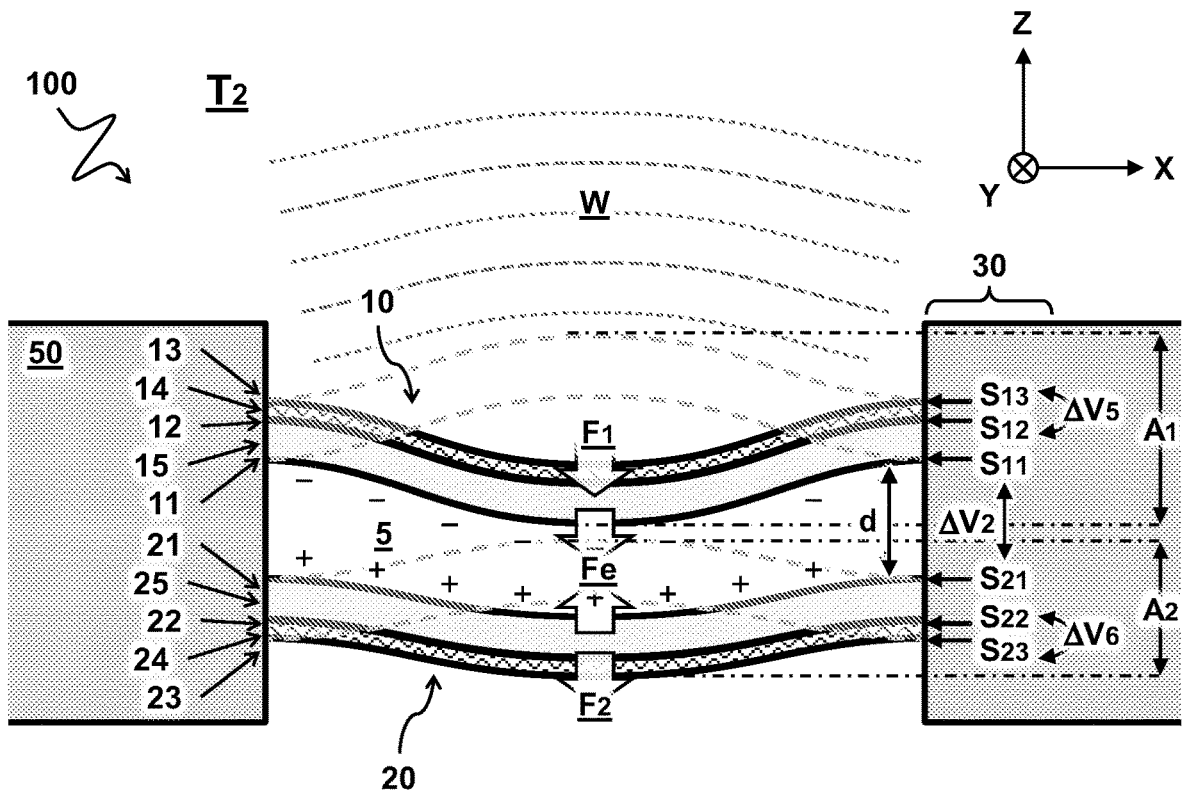

FIGS. 1A and 1B illustrate an ultrasonic transducer 100. In some embodiments, the ultrasonic transducer 100 comprises a stack of at least two membranes 10, 20 attached to a substrate 50. In a preferred embodiment, the membranes 10, 20 are separated by a spacing 5, e.g. pocket, there between. For example, the substrate 50 surrounds the stack in plane X, Y of the membranes. In one embodiment, a first membrane 10 in the stack is parallel to and facing a second membrane 20 in the stack. Preferably, the membranes 10, 20 are configured to vibrate at an ultrasonic frequency U for transceiving ultrasonic waves W.

In some embodiments, each membrane 10, 20 comprises a set of electrodes 11-13; 21-23. An electric circuit 30 can be coupled to the electrodes configured to apply electrical signals. For example, the electric circuit 30 comprises a controller or control circuit configured to apply the electrical signals. In one embodiment, a first electric signal S11 is applied to a first electrode 11 on the first membrane 10, and a different, second electric signal S21 is applied to a second electrode 21 on the second membrane 20. Preferably, the first and second electric signals S11, S21 are configured to apply (cause) a varying voltage $\Delta V1$, $\Delta V2$ between the first electrode 11 and the second electrode 12 during a respective vibration cycle T1, T2 of the membranes 10, 20, e.g. at the ultrasonic frequency U or another frequency preferably with some phase relation to the vibration cycle. In a preferred embodiment, the first electrode 11 on the first membrane 10 is configured to interact with the second electrode 21 on the second membrane 20 by a varying electrostatic force Fe during the respective vibration cycle T1, T2 depending on the varying voltage $\Delta V1$, $\Delta V2$.

For example, the voltage between the electrodes changes in value between $\Delta V1$ or $\Delta V2$ during the respective sub-periods of the cycle T1, T2. The varying voltage, or electric potential difference between the electrodes, may correspond to the varying difference in respective voltages (e.g. compared to ground) of the electric signals S1, S2 during different parts of the vibration cycle. As illustrated in the figure, the varying voltage may cause a corresponding variation in electric charges +/− on at least one of the electrodes with respect to the other electrode. While the present figure illustrates only variation in charges on the first electrode 11, the charge can also be varied on the second electrode 12, or on both electrodes (e.g. if the variation is not the same).

Typically, opposite charges −/+ on the respective (opposing) electrodes 11, 21 may cause an attractive electrostatic force Fe as indicated (e.g. during a second half T2 of the vibration cycle). In principle like charges (+/+; −/−) on the respective electrodes can repel each other, e.g. during a first half T1 of the vibration cycle (e.g. half the vibration period apart). However, in practice repulsion may be less prominent or negligible. In some embodiments, the charges on the respective electrodes during the first half T1 of the vibration cycle can also both be zero. For example, the electrostatic force is more affected by the charge difference or voltage between the electrodes.

Without, being bound by theory, an (attractive) electrostatic force Fe between charges on a pair of parallel plates may be described by $Fe = \varepsilon_0 \cdot A \cdot \Delta V^2 / 2d^2$, where "$\varepsilon_0$" is the vacuum permittivity ($\sim 8.85 \cdot 10^{-12}$ F·m$^{-1}$; farads per meter), "A" is the surface area of the plates, "$\Delta V$" is the voltage or potential difference between the plates, and "d" is the distance between the plates. For example, a surface area of each of the first and second electrodes 11, 12 is at least hundred square micrometer, at least two hundred square micrometer, at least five hundred square micrometer, at least one square millimeter, at least two square millimeter, at least five square millimeter, at least ten square millimeter, at least twenty square millimeter, at least fifty square millimeter, at least one square centimeter. The higher the surface area of the first and second electrodes 11, 12, the higher the electrostatic force (using the same voltage). For example, a distance between the membranes 10, 20 and/or between the first and second electrodes 11, 12 is less than one centimeter, less than half a centimeter, less than two millimeter, less than one millimeter, less than half a millimeter, less than two hundred micrometer, less than one hundred micrometer, or even less than fifty micrometer. The smaller the distance, the higher the electrostatic force.

While the electrodes described herein may deviate, e.g. in geometry, from an ideal pair of parallel plates, the general trends can be similar. For example, the electrostatic force Fe is typically higher when the voltage $\Delta V$ is higher, and lower or even zero when there is a lower or no voltage ($\Delta V=0$). For example, the electrostatic force Fe is typically higher when the (effective) area of the electrodes (electrode pad) is higher and/or the effective distance between the electrodes is lower. Preferably, the respective first and second electrodes include a respective electrode pad covering at least part of the respective inner surfaces of the membranes facing each other. Preferably, the distance "d" between the membranes (e.g. in rest) or electrode pads is relatively small, e.g. less than a diameter of the membranes by a least, a factor one, two, three, four, five, ten or more. Some embodiments described later with reference to FIG. 7, may e.g. improve the geometry, e.g. layout of the electrodes and/or embossing parts of the membranes to keep the distance between the electrodes more uniform for different distances from the membrane center.

In some embodiments, the electric circuit 30 is configured to apply a first voltage $\Delta V1$, between the first and second electrodes 11, 12 during a first half T1 of the vibration cycle, and a second voltage $\Delta V2$ between the first and second electrodes 11, 12 during a second half T2 of the vibration cycle, wherein the second voltage $\Delta V2$ is higher than the first voltage $\Delta V1$. For example, the second voltage $\Delta V2$ is at least one volt more than the first voltage $\Delta V1$, preferably at least two volts, at least five volts, at least ten volts, at least twenty volts, at least fifty volts, at least hundred volts, or more. The more voltages $\Delta V1$, $\Delta V2$ vary during different parts of the vibration cycle, the more the electrostatic forces may correspondingly vary. For example, the first voltage $\Delta V1$ can be relatively low or preferably zero, i.e. no voltage between the electrodes 11, 12. For example, the second voltage $\Delta V2$ can be in a range between one and thousand volt, preferably between ten and five hundred volt, most preferably between fifty and two hundred volt.

In some embodiments, the electric circuit 30 is configured to apply, by the variation in voltage $\Delta V1$, $\Delta V2$, an attractive electrostatic force Fe between the first and second electrodes 11, 12 only during the second half T2 of the vibration cycle. In other or further embodiments, the attractive electrostatic force Fe is exclusively (or predominantly) applied during one sub period of the vibration cycle (e.g. in the second half T2) when the first membrane 10 (e.g. its center) moves in one direction −Z, and not during another sub period of the of the vibration cycle (e.g. in the first half T1) when the first membrane 10 moves in an opposite direction +Z.

It may be noted that for illustrative purposes the membranes are shown in the figure at the end of the respective halves T1, T2 of the vibration cycle, i.e. when the deviation is maximal at the respective amplitude A1, A2. In reality, the movement (Z position) of the membranes may lag in phase behind the applied forces; or vice versa, the forces are applied in phase before the movement (e.g. see FIG. 2). This may also depend on the frequency of the applied forces with respect to the resonance frequency of the membranes. For example, the membranes 10, 20 are configured to exhibit a respective vibration at or near their resonance frequency to transmit and/or receive ultrasonic waves W resonantly interacting with one or both of the membranes.

Typically the force to enhance the first amplitude A1 is most efficient when applied during a period when the membrane moves in the same direction as the force, e.g. in the half period between the time that the first membrane 10 moves from the downward to the upward position. Conversely the second amplitude A2 can be diminished by the force in the opposite direction of movement during the same half period. In effect the first amplitude A1 can be enhanced at the cost of the second amplitude A2, e.g. by pulling against this second membrane.

In some embodiments, as shown here, the electric circuit 30 is configured to apply sets of electrical signals to respective sets of electrodes causing the membranes 10, 20 to vibrate in unison moving in the same direction +Z or −Z at the same time. In other words, the vibrations of the first and second membranes are substantially in phase, e.g. with a phase difference of less than forty five degrees, preferably less than twenty degrees, less than ten degrees, most preferably zero degrees. For example, the phases of the vibrations are controlled by the respective phases of one or more of the electrical (driving) signals. By having the membranes move in unison, the second membrane 20 can further enhance the amplitude of the first membrane 10 e.g. by pulling on it while it already moves towards the second membrane 20. While the present embodiment shows three electrodes per membrane, there can also be two, e.g. as shown in FIGS. 3-7. Alternatively to the membranes vibrating in phase, it can also be envisaged to vibrate the membranes in counter-phase. This will be further illustrated e.g. with reference to FIG. 5-6.

The in-phase (or counter-phase) movement of the membranes 10, 20 may be effected by applying further forces on at least one of the membranes. The further forces may in principle also be electrostatic forces, e.g. applied to another electrode (not shown); or caused by an actuator e.g. next to the membranes (not shown), or any other interaction. In a preferred embodiment, as described herein, the further forces are applied by piezoelectric interaction. Most preferably a piezo electric layer 14, 24 applied to one or both of the membranes 10, 20.

In some embodiments, at least one of the membranes 10, 20 comprises a respective piezoelectric layer 14, 24 sandwiched by a respective set of electrodes 12, 13; 22, 23 to transceive piezoelectric signals S12, S13; S22, S23 in accordance with the vibration cycle. In other or further embodiments, the piezoelectric signals S12, S13; S22, S23 are configured to generate a respective piezoelectric force F1, F2 on a respective at least one of the membranes 10, 20. For example, the piezoelectric force can be applied to the first, membrane 10 and/or the second membrane 20, preferably both, e.g. by applying the same or similar signals causing synchronous movement.

In one embodiment, a first set of piezoelectric signals S12, S13 is applied to a first set of electrodes 12, 13 on the first membrane 10 to cause a varying voltage ΔV3, ΔV4 across a first piezoelectric layer 14 on the first membrane 10, and a second set of piezoelectric signals S22, S23 is applied to a second set of electrodes 22, 23 on second membrane 20 to cause a varying voltage DV5, DV6 across a second piezoelectric layer 24 on the second membrane 20, wherein the varying voltage ΔV3, ΔV4 across the first piezoelectric layer 14 is in phase with the varying voltage ΔV5, ΔV6 across a second piezoelectric layer 24, or in counter-phase (180 degrees out of phase).

By applying the same or similar phase to the piezoelectric signals on each of the membranes, they can be actuated by the respective piezoelectric forces to move in unison. By applying the signals in counter-phase (or by reversing the poling of the piezoelectric layer) the membranes may move in counter-phase meeting each other in the center as will be illustrated in FIGS. 5-6. For example, the second varying voltage comprise a first piezoelectric voltage ΔV3 between the signals S12, S13 during the first half T1 of the vibration cycle, and a second piezoelectric voltage ΔV5 between the signals S12, S13 during the second half T2 of the vibration cycle. For example, the third varying voltage comprise a third piezoelectric voltage ΔV4 between the signals S22, S23 during the first half T1 of the vibration cycle, and a second piezoelectric voltage ΔV6 between the signals S22, S23 during the second half T2 of the vibration cycle. While in some embodiments, it can be advantageous that the piezoelectric signals between membranes correspond, e.g. S12=S22 and/or S13=S23, they can also be offset (e.g. with the same difference S12−S13=S22−S23). The relative amplitudes can also be different (e.g. ΔV3=c·ΔV5, where "c" can also be negative depending on the poling of the respective piezoelectric layers 13, 24).

In some embodiments, a first set of piezoelectric signals S12, S13 to a first piezoelectric layer 14 on the first membrane 10 is configured to generate a first piezoelectric force in a same direction −Z, —Z as the electrostatic force Fe during a second half of the vibration cycle T2. In other or further embodiments, e.g. as shown in FIGS. 1-4, the combined first piezoelectric force and electrostatic forces F1, Fe cause an increased first amplitude A1 of the first membrane 10 compared to a second amplitude A2 of the second membrane 20. For example, as shown in the figure, the arrows indicating respective directions of the piezoelectric and electrostatic forces F1, Fe for the first membrane 10 point in the same direction during different parts of the vibration cycle, e.g. the time T2 in the cycle when the membranes are both moving down.

In other or further embodiments, a second set of piezoelectric signals S22, S23 to a second piezoelectric layer 24 on the second membrane 20 is configured to generate a second piezoelectric force F2 in an opposite direction −Z, +Z as the electrostatic force Fe during the second half of the vibration cycle T2, wherein the combined piezoelectric and electrostatic forces Fp, Fe cause an decreased second amplitude A2 of the second membrane 20. For example, as shown in the figure, the arrows indicating respective directions of the piezoelectric and electrostatic forces Fp, Fe for the second membrane 20 point in opposite directions during different parts of the vibration cycle T1, T2, e.g. the times T1 and T2 in the cycle that the membranes are both up and both down, respectively. Alternatively to enhancing one of the vibration amplitudes A1 at the cost of the other amplitude A2, it can also be envisaged to enhance both amplitudes, as will be illustrated later with reference to FIGS. 5-6.

Aspects of the present disclosure can be embodied as a method of controlling an ultrasonic transducer 100 comprising a stack of at least two membranes 10, 20 as described herein. For example, the method comprises one or more of the steps of applying a first electric signal S11 to a first electrode 11 on the first membrane 10, and a different, second electric signal S21 to a second electrode 21 on the second membrane 20 to cause a varying voltage ΔV1, ΔV2 between the first electrode 11 and the second electrode 12 during a respective vibration cycle T1, T2 of the membranes 10, 20. Accordingly, the first electrode 11 on the first membrane 10 can interact with the second electrode 21 on the second membrane 20 by a varying electrostatic force Fe during the respective vibration cycle T1, T2 depending on the varying voltage ΔV1, ΔV2.

In some embodiments, the electronic circuit 30 comprises a signal generator (not shown) configured to generate electrical signals including one or more frequencies at or near the resonance frequency of the first membrane 10 and/or second membrane 20. In other or further embodiments, electronic circuit 30 comprises a signal detector (not shown) configured to detect electrical signals including one or more frequencies at or near the resonance frequency of the first membrane 10.

While in principle the membranes may support different resonant vibrations, preferably the fundamental mode (e.g. designated as $u_{01}$ or 1 s) with the lowest resonance frequency is used for efficiently generating or receiving the acoustic waves. For example, the resonance frequency is determined, e.g., by one or more of the membrane material properties and diameter of the acoustic membranes. Also other or further parameters can be used, e.g. density, Poisson ratio and Young's modulus. In some embodiments, the fundamental frequency (Hz) can be expressed using parameters such as the membrane tension (N/m), density (kg/m$^2$), diameter (m). Also other or further parameters can be used such as membrane thickness, elastic modulus, et cetera. Alternatively, or additionally, the fundamental frequency of the membranes can be determined by any other analytic or numeric modeling. In one embodiment, a specific resonance frequency is determined by setting a specific diameter in relation to the tension and density of the membrane. For example, the diameter may correspond to half a wavelength at the resonance frequency of waves traveling in the membrane to produce a standing wave.

In a preferred embodiment, a piezoelectric transducer is used to actuate the membranes. Most preferably, piezoelectric material is disposed as a layer on the flexible membrane. Also other layers can be provided, e.g. electrode layers used to apply the respective electrical signals to the piezoelectric layer. Also capacity and/or conductive layers for applying electrostatic charges can be envisaged, as described herein. These layers may be charged by other or further electrical signals, e.g. applying static charges, or dynamic application of charge during a partial cycle of the respective vibration.

By driving the transducers with a carrier frequency at or around a respective resonance frequency of the transducers performance may be improved. For example, a first or ground resonance of the membrane is used. The resonance frequency of the transducers may be relatively high, e.g. more than one kiloHertz, more than ten kiloHertz, more than 100 kiloHertz or even more than one MegaHertz. Such high frequencies may not be suitable for all applications. For example, frequencies above eight hundred hertz may be difficult to feel for haptic applications. For example, an optimal frequency for haptic feedback may be between fifty and five hundred hertz, preferably between hundred and three hundred hertz.

In some embodiments, the electrical signals comprise multiple frequencies including a carrier frequency as best as possible corresponding to the resonance frequencies of the transducers; and an envelope or modulation frequency depending on the application. For example, a haptic feedback device may use a carrier frequency at 40 kHz which is amplitude modulated by a modulation frequency at 200 Hz. It can also be envisaged to use more than two frequencies, in particular a bandwidth of frequencies, e.g. including resonance frequencies of the respective transducers.

In some embodiments, an acoustic device is formed comprising an array of multiple acoustic transducers as described herein. For example, the transducers can be formed by a patterned stack on a flexible substrate. In one embodiment, the stack comprises a piezoelectric layer sandwiched between respective bottom and top electrode layers. In some embodiments, an actuation surface of the acoustic transducers includes part of the flexible substrate at the contact areas. In other or further embodiments, the membranes can be separately attached to a surrounding substrate.

In some embodiments, each membrane 10, 20 comprise a respective flexible foil 15, 25 or other flexible substrate. For example, the flexible foil 15, 25 can act as a support for the other layers, e.g. the electrodes and/or piezoelectric layers. In some embodiments, e.g. as shown, the flexible foil 11 is fixed, e.g. laminated, or otherwise disposed on a relatively rigid support substrate 50. For example, the flexible foil 11 can be laminated and/or otherwise adhered to the support substrate 50. The fixation between the flexible substrate and the support substrate or other rigid structure may be provided e.g. during and/or after manufacturing. The support substrate can be relatively flat similar or thicker compared to the flexible foil 11. Preferably, the support substrate 50 has a relatively high flexural rigidity compared to the flexible foil 11, e.g. higher by at least a factor two, three, five, ten, or more. Accordingly, the support substrate 50 may provide additional structural integrity. Preferably, the support substrate 50 is provided with openings at positions corresponding to one or more of the ultrasonic transducers. The openings may allow relatively free movement of the transduced surfaces while still providing a rigid support.

In some embodiments (not shown) one of the first or second membranes is flush with the surrounding substrate 50. This may be advantageous e.g. to contact a target object. In other or further embodiments, the respective membrane contacting the target subject can be relatively thick, e.g. protect the other membrane which can be relatively thin.

Figure 2:
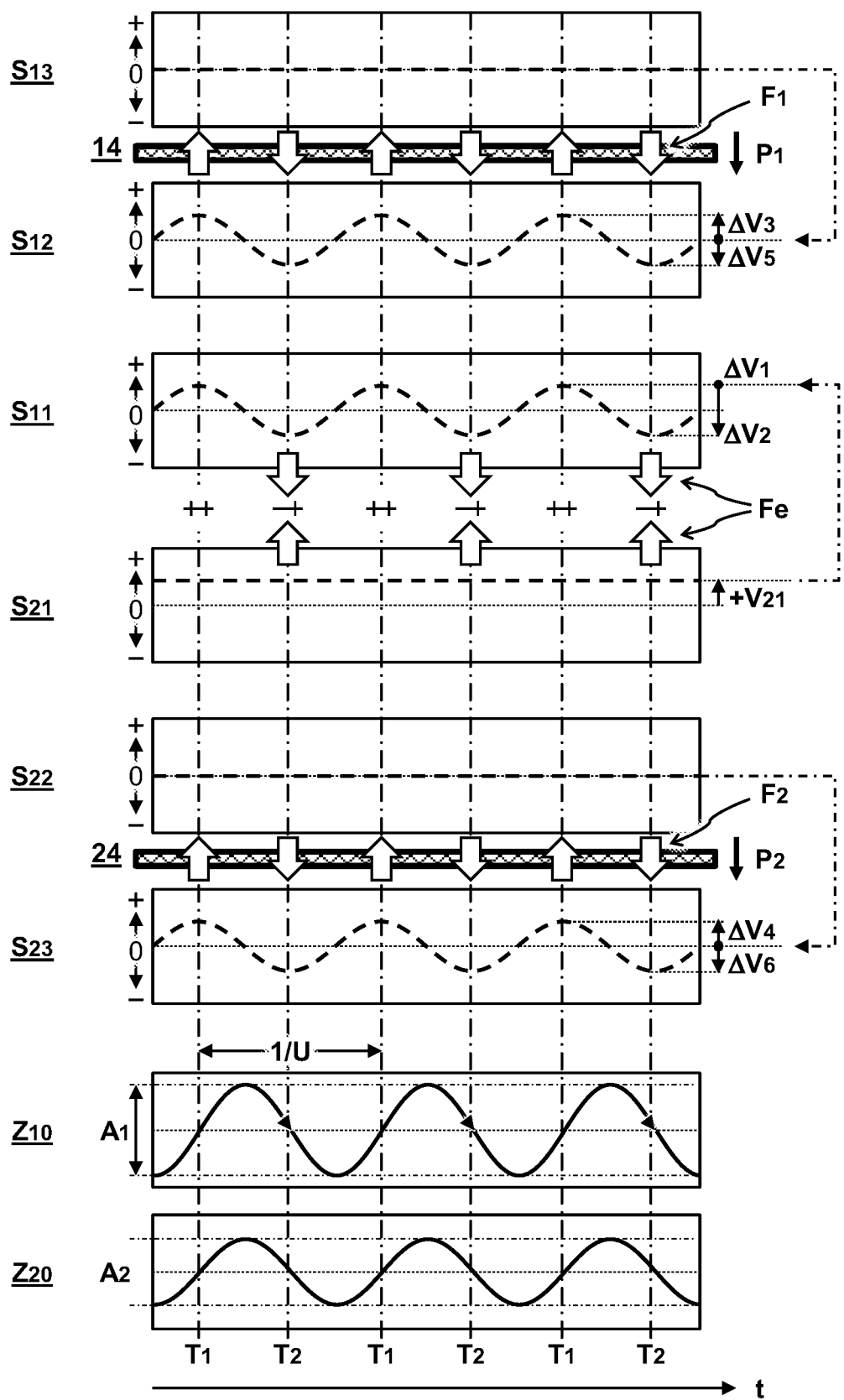
FIG. 2 illustrates an example of corresponding electrical signals and vibrations.

FIG. 2 illustrates an example of electrical signals S11-S13, S21-S23, e.g. as applicable to respective electrodes 11-13, 21-23 of an ultrasonic transducer 100 shown in the preceding figure; and corresponding vibrations Z10, Z20 of the respective membranes 10, 20.

The top of the figure illustrates the piezoelectric signals S13, S12 applied to the electrodes 13, 12 sandwiching the first piezoelectric layer 14 there between. In some embodiments, e.g. as shown, the voltage ΔV3, ΔV5 between the signals S12, S13 applied to the electrodes 12, 13 sandwiching the piezoelectric material 14 varies as a function of time. Arrows through the piezoelectric material 14 indicate the direction of the first piezoelectric force F1 which may depend on the varying voltage ΔV3, ΔV5 between the signals applied to the electrodes and the poling P1 of the first piezoelectric layer 14.

The top middle of the figure illustrates the first set of electrostatic signals S11, S21, e.g. as applied to the first and second electrodes 11, 12. Arrows between the signals S11, S21 indicate the electrostatic forces Fe between the electrodes. For example, electrostatic forces Fe are attractive when there is some voltage ΔV2 between the signals S11, S21, e.g. when the charges (−/+) on the electrodes 11, 12 are opposite, or when one electrode is charged more than the other electrode. Conversely, when the voltage ΔV1 between the electrodes is lower, e.g. zero when the charges are the same (both charged the same, or both without charge), the electrostatic forces Fe may be also relatively low or zero (or repulsive).

The bottom middle of the figure illustrates the second set of piezoelectric signals S22, S23, e.g. as applied to the electrodes 22, 23 sandwiching the second piezoelectric layer 24 there between. Arrows through the piezoelectric material 14 indicate the direction of the second piezoelectric force F2 which may depend on the varying voltage ΔV4, ΔV6 between the signals applied to the electrodes and the poling P2 of the second piezoelectric layer 24. In some embodiments, e.g. as shown here, the second set of piezoelectric signals S22, S23 applied across the second piezoelectric layer 24 are the same as the first set of piezoelectric signals S12, S13 applied across the first piezoelectric layer 14. This may provide a relatively easy control of the signals, e.g. the same signals to the respective electrodes can be connected.

The bottom of the figure illustrates the vibration of the membranes 10, 20. This is indicated here by the varying position Z10, Z20 e.g. of a point on the respective membrane. It may be noted that the movement of the membranes may follow (lag behind) the applied piezoelectric and/or electrostatic forces. Typically, a phase of the vibration may depend on a phase of the electric signals (voltages), e.g. applied across the piezoelectric material 14, 24 of one or both of the membranes, e.g. the piezoelectric signals S12, S13; 822, S23. The phase of the vibration may also depend on other factors such as a poling P1, P2 of the piezoelectric material 14, 24. Besides an electrical phase induced by the transfer function of the voltage/current source to the complex electrical impedance of the piezomaterial, there is also an acoustic phase. For weakly damped harmonic oscillators this phase difference e.g. goes from −90 to +90 degrees as the frequency is swept through the resonance frequency. The frequency width of the region where the phase changes can be a measure for the bandwidth of the device. This can also be related to the poling direction. For example poling the material in an opposite direction may result in the vibration being actuated in the opposite direction (shown e.g. in FIG. 6). Additionally or alternatively to piezoelectric actuation, also other forms of actuating the respective membranes can be envisaged. Also other or further factors may play a role in keeping the vibrations substantially in phase, such as the interconnecting common substrate or pocket between the membranes.

In some embodiments, e.g. as shown in FIG. 1, the respective sets of electrodes 12, 13; 22, 23 for applying piezoelectric electrical signals S12, S13; 822, S23 to the respective piezoelectric layer 14, 24 are separate and independent from the first electrode 11 and second electrode 12, respectively, for applying the electric (electrostatic) signals S11, S21. This may have the advantage of providing independent control over the electrostatic and piezoelectric interactions. On or more of the electrodes can also be combined as will further discussed in the following.

While the present embodiments illustrate a constant voltage applied to one of the electrostatic electrodes, it can also be envisaged to vary the voltage on both electrostatic electrodes. For example, the applied signals may include pulse shaping (apply time dependent pulses) on both membranes in order to optimize the vibration of the membranes (e.g. to make the vibration more or less linear or increase the amplitude further).

Figure 3A:
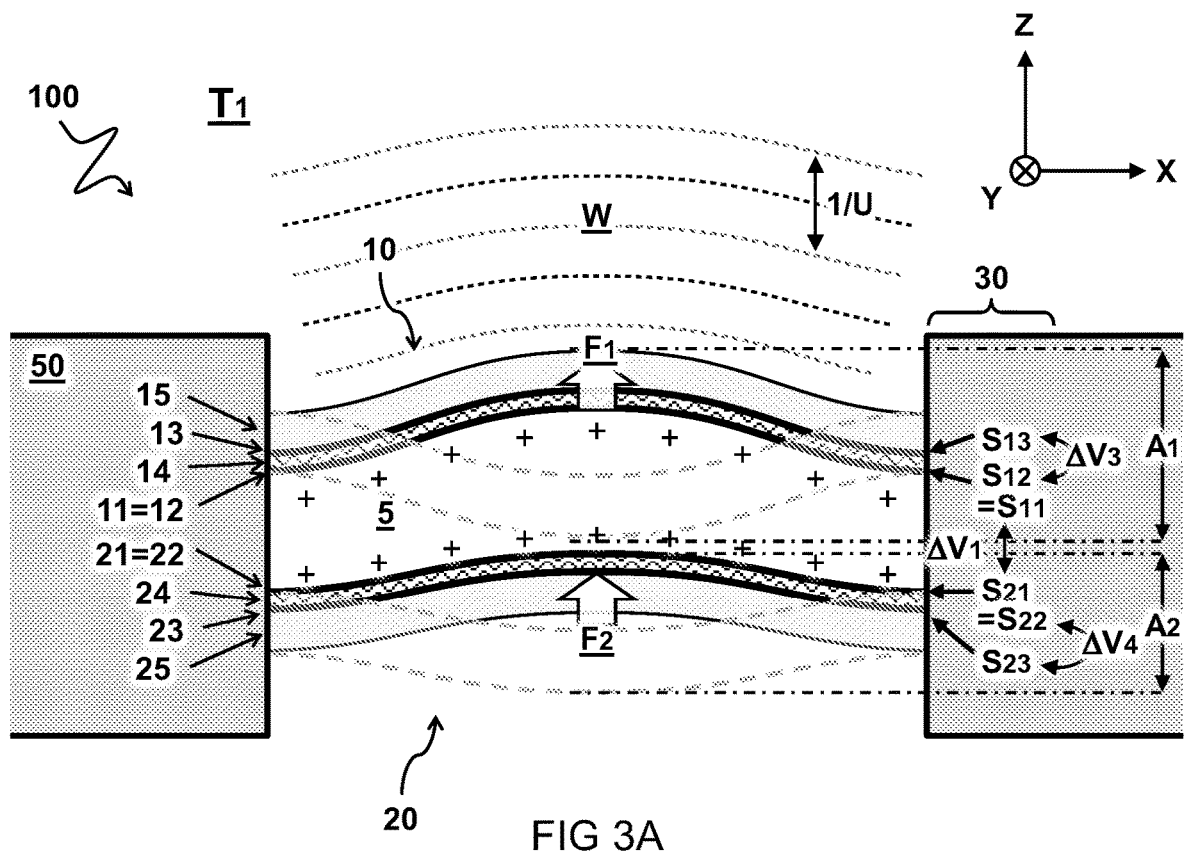
FIGS. 3A and 3B illustrate an ultrasonic transducer wherein some of the electrodes are combined.
Figure 3B:
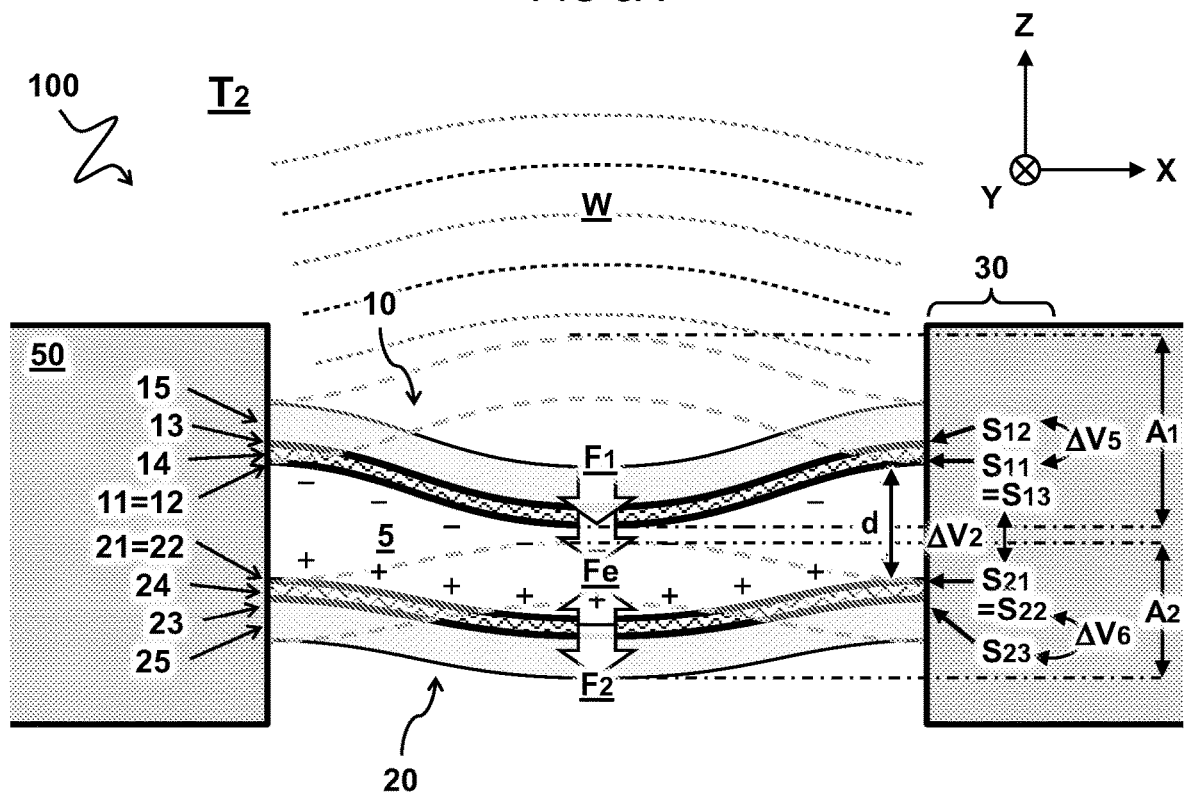

FIGS. 3A and 3B illustrate an ultrasonic transducer 100 wherein some of the electrodes 11, 12; 21, 22 are combined. Compared to FIGS. 1A and 1B, the piezoelectric layers 14, 24 are here on the inside and some of the electrodes are combined. Another or further arrangement can also be envisaged wherein one the respective electrodes is on the outside. For example, the carrier layer can act as another capacitor to add to the capacitance in between the membranes.

In some embodiments, the first electrode 11 on the first membrane 10, which is configured to interact with the second electrode 21 on the second membrane 20 by the varying electrostatic force Fe, is also one of a first set of piezo electrodes 12, 13 sandwiching a first piezoelectric layer 14 on the first membrane 10. In other or further embodiments, the second electrode 21 (=22) on the second membrane 20, which is configured to interact with the first electrode 11 (=12) on the first membrane 10 by the varying electrostatic force Fe, is also one of a second set of piezo electrodes 22, 23 sandwiching a second piezoelectric layer 24 on the second membrane 20. By using the same electrode on at least one the membranes for electrostatic and piezoelectric interaction, the number of electrodes can be reduced.

Figure 4:
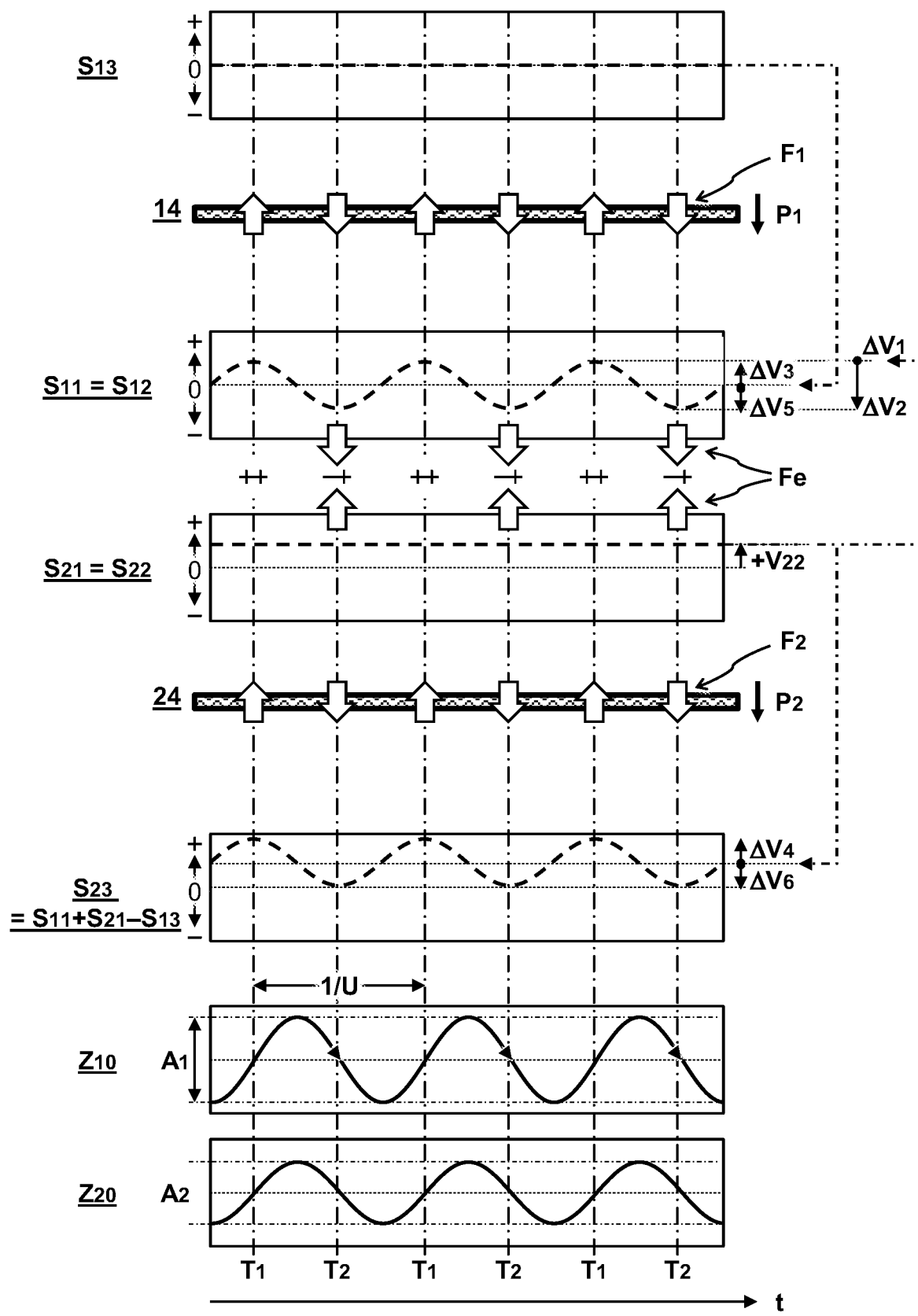
FIG. 4 illustrates an example of corresponding electrical signals and vibrations.

FIG. 4 illustrates respective signals and vibrations. e.g. as applied to the transducer of the preceding figure. Here the signal S11=S12, and the signal S21=S22, as the respective first and second electrodes also function as one of the piezoelectric electrodes. Compared to FIG. 2, the signals S22 (=S21) and S23 are offset by a voltage +V22. This is one way to provide simultaneously a varying electrostatic interaction between the first and second electrodes, and varying piezoelectric interaction for both piezoelectric layers 14, 24. Of course also other signals can be envisaged which provide the same or similar simultaneous interactions. For example, one or both directions of poling P1, P2 can be flipped and the corresponding signals also flipped. For example, a fixed or variable offset can be added to the signals maintaining relative voltage differences. For example, depending on any set of electrostatic signals, the piezoelectric signals can be adapted to maintain similar voltage differences across the respective piezoelectric layer. While the present figures show sinusoidal signals, also other signals can be envisaged, e.g. block waves, or any other shape to improve electrostatic and/or piezoelectric interaction. Also the phases can be offset to improve interaction.

Figure 5A:
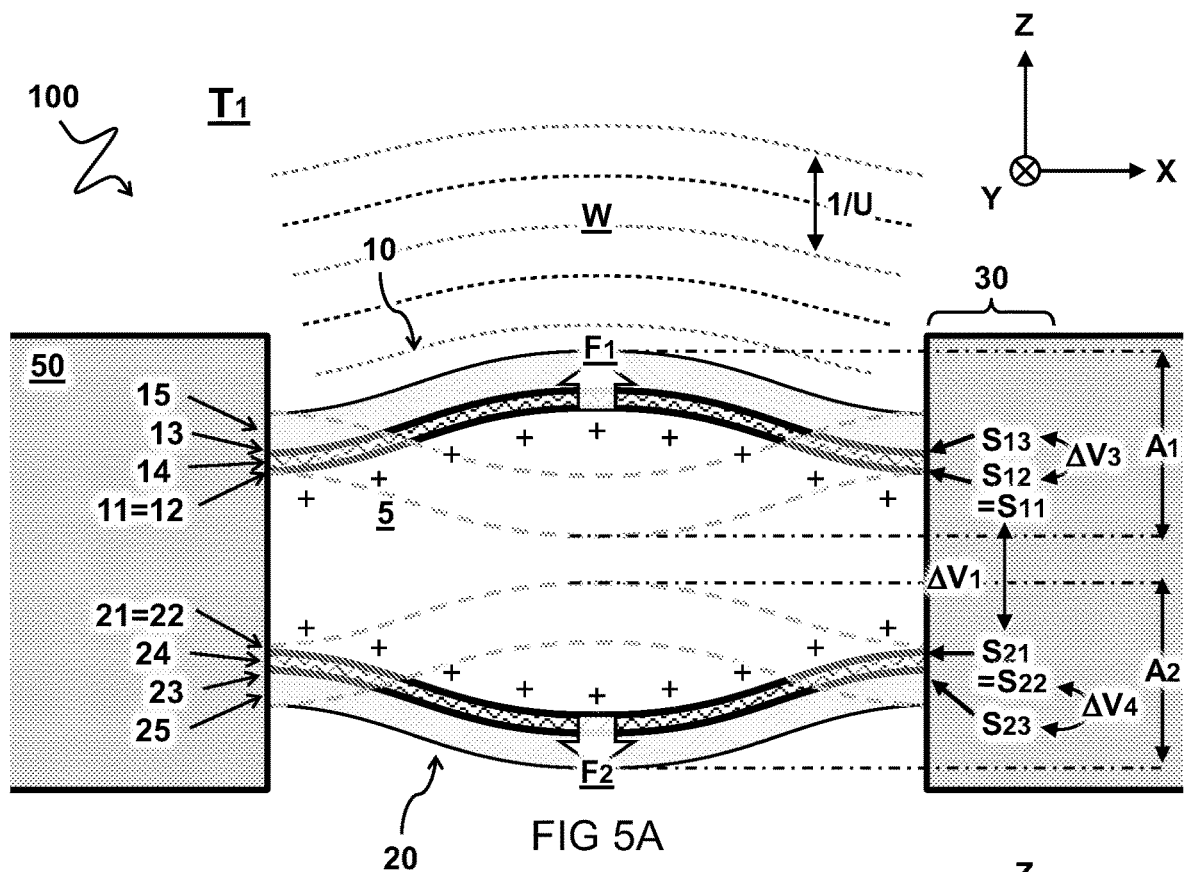
FIGS. 5A and 5B illustrate an ultrasonic transducer wherein the membranes vibrate in counter-phase.
Figure 5B:
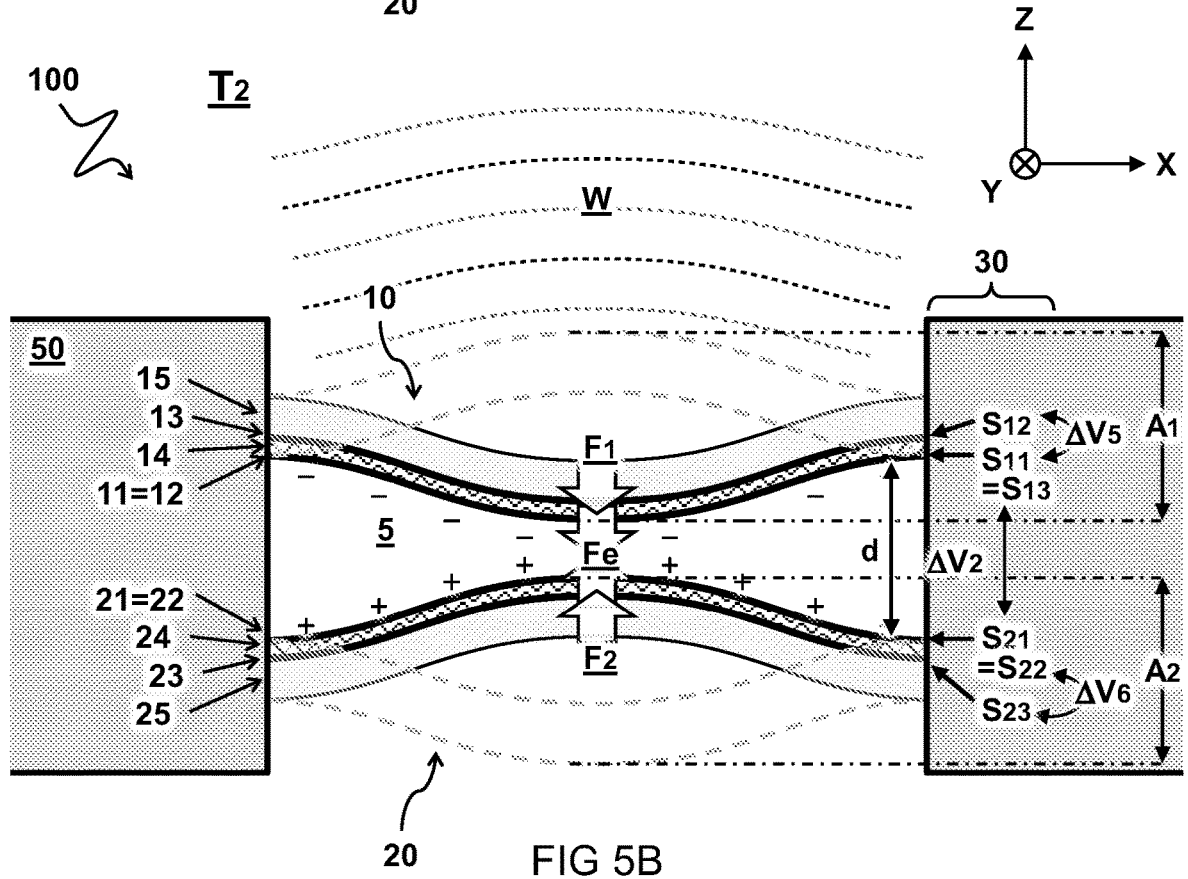

FIGS. 5A and 5B illustrate an ultrasonic transducer 100 wherein the membranes vibrate in counter-phase. While the present figure illustrates piezoelectric layers on the inside, similar as FIGS. 3A and 3B, this could also be implemented in other embodiments described herein. For example, the signals can be flipped, or the poling of one of the piezoelectric layers. In some embodiments, the distance "d" between the membranes may be increased to prevent the membranes touching each other when they both move towards each other. In other or further embodiments, the distance "d" this physical touching of the membranes can provide a desired interaction. It can also be envisaged that a pressure in the pocket between the membranes prevents the touching. One advantage of the membranes moving in counter-phase, may be that the asymmetry of the membrane movement may increase bandwidth. One advantage of the membranes moving in unison, may be that the electrostatic force on the membranes is not countered by optional pressure forces in the pocket (if the membranes move towards each other), so the ultrasonic waves can be more intense.

Figure 6:
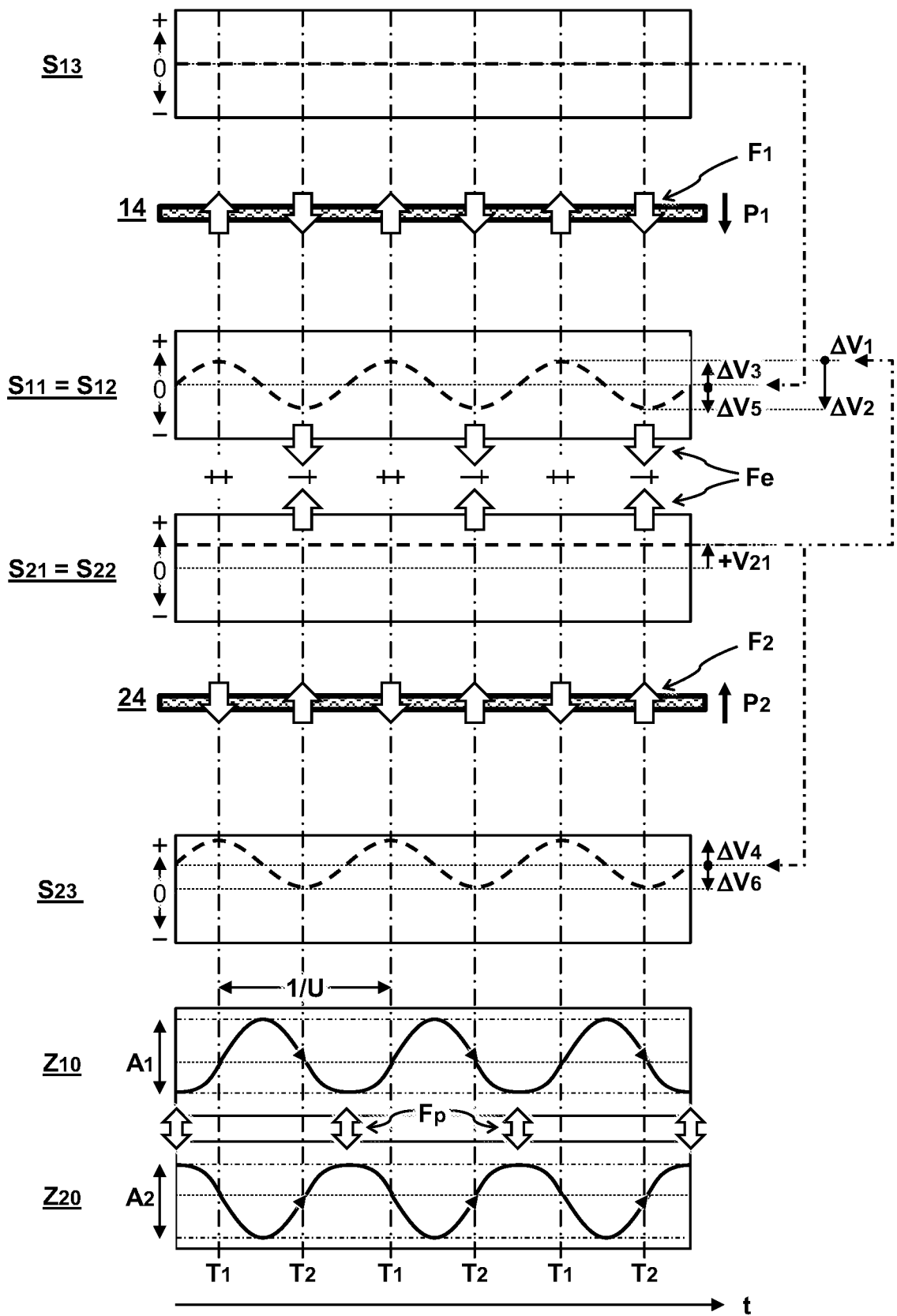
FIG. 6 illustrates an example of corresponding electrical signals and vibrations.

FIG. 6 illustrates respective signals and vibrations, e.g. as applied to the transducer of the preceding figure. Comparing e.g. to FIG. 4, the signals can in principle be similar or the same while the poling of one of the piezoelectric layers is reversed (here P2) leading to opposite piezoelectric forces (here F2 in the second piezoelectric layer 24. Alternatively. e.g. piezoelectric signals may be reversed to one of the piezoelectric layers, while compensating with the other signals to maintain relative voltage differences. The respective vibrations Z10, Z20 of the membranes are shown to be here in counter phase. In some embodiments, the may induce a displacement asymmetry e.g. in a motion of the first membrane 10 during the vibration to one side compared to the opposite side. For example, the first membrane 10 has a first amplitude between an equilibrium position of the first membrane 10 and a maximum extended position of the first membrane 10 to the one side, and a second amplitude between the equilibrium position and a maximum extended positon of the first membrane 10 to the other side, wherein the second membrane 20 is configured to affect the motion of the first membrane 10 by the electrostatic interaction for inducing a difference between the said amplitudes, e.g. at least five percent difference, or at least ten percent. These and other embodiment inducing displacement asymmetry may contribute to boosting an effective bandwidth in membrane based transducers.

Figure 7A:
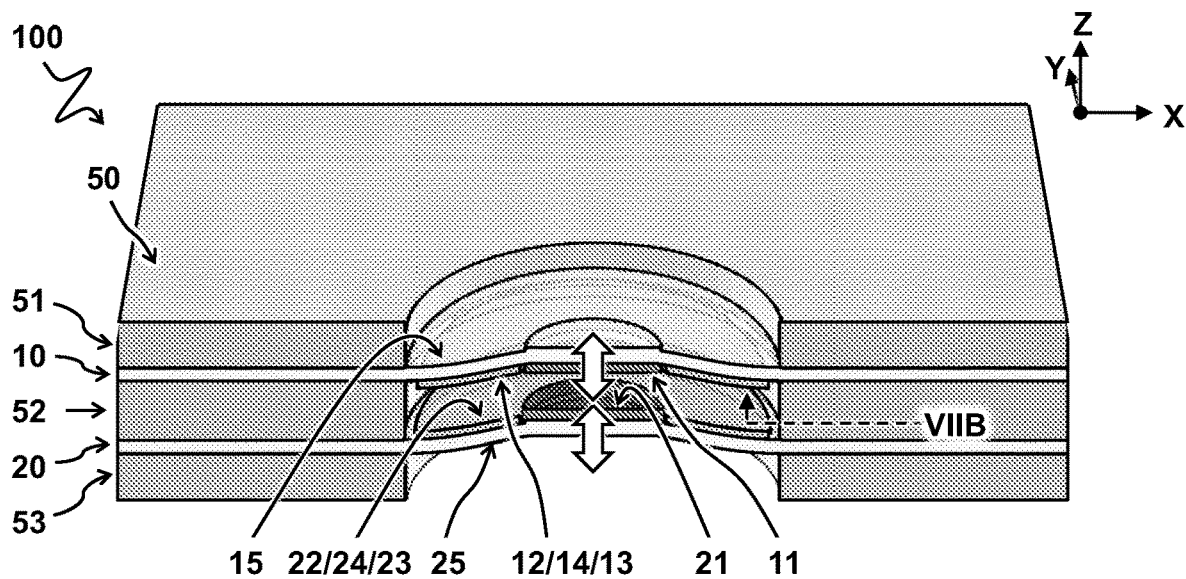
FIG. 7A illustrates a perspective view cut away view of an ultrasonic transducer wherein electrostatic and piezoelectric electrodes (electro pads) are disposed adjacent on the respective membranes.

FIG. 7A illustrates a perspective view cut away view of an ultrasonic transducer 100 wherein electrostatic and piezoelectric electrodes (electro pads) are disposed adjacent on the respective membranes 10, 20.

In some embodiments, each of the membranes 10, 20 comprises a flexible foil 15, 25 with a stack of layers including the respective electrodes 11, 12, wherein the membranes 10, 20 are adhered to respective substrate layers 51-53 of the substrate 50 with an intermediate substrate layer 52 disposed between the flexible foils 15, 25 to form the spacing there between, wherein the ultrasonic transducer 100 is formed at an opening in the substrate layers 51-53. For example, the spacing or distance between the membranes 10, 20 is determined by a thickness of the intermediate substrate layer 52.

In some embodiments, at least one, preferably both of the membrane 10, 20 has a relatively thick and/or stiff section at a center of the membrane compared to a (radial) edge of the membrane, e.g. the membranes are bossed at the center. For example, this can have the effect of increasing the total displaced volume compared to peak out-of-plane displacement of the membrane. For example, the relatively thick or stiff central section may have less curvature during deflection (e.g. more block shaped than Gaussian) so the effect of the inward contraction can extend over a larger area than just the center peak.

In some embodiments, a center of the membrane is thicker than the edges, e.g. by at least a factor 1.1, 1.2, 1.5, 2 or more. In other or further embodiments, material at a center of the membrane is stiffer than at the edge, e.g. by at least a factor 1.1, 1.2, 1.5, 2 or more. Preferably, the thickened and/or stiffened region extends over a subsection of the total area, e.g. covering between twenty and ninety percent of the area, preferably between forty and eighty percent, or between fifty and seventy percent. In some embodiments, the membrane is provided with an extra layer or embossing on at least one side, preferably the inward directed first side 10a. As will be appreciated, having extra material on one side, off centre with respect to the membrane central plane, may also contribute to the displacement asymmetry.

Figure 7B:
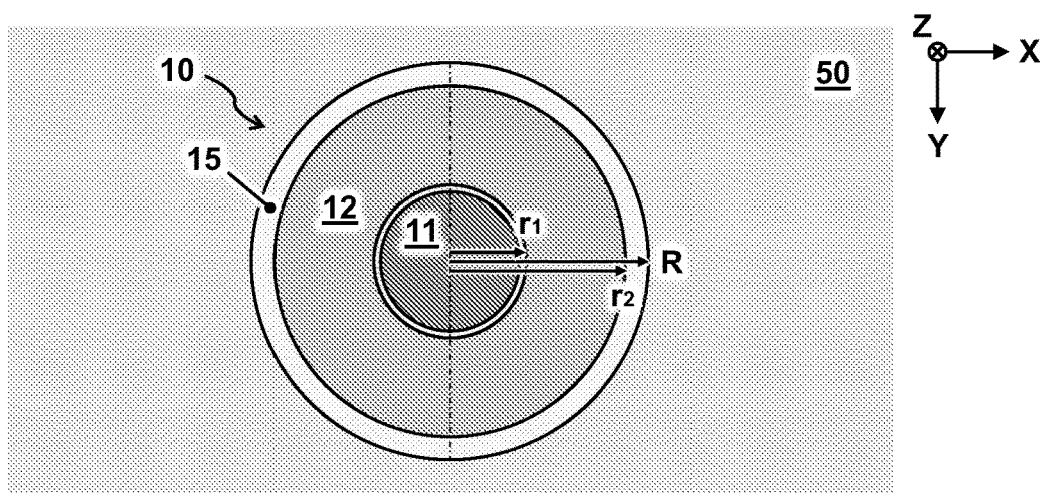
FIG. 7B illustrates a bottom view of the first membrane as indicated by VIM in FIG. 7A.

FIG. 7B illustrates a bottom view of the first membrane 10 as indicated by VIIB in FIG. 7A. In some embodiments, wherein the first membrane 10 comprises a first area of conductive material forming the first electrode 11 for electrostatic interaction with the second electrode on the second membrane 20; and a second area of conductive material, adjacent the first area, forming a piezoelectric electrode 12 of a set of piezoelectric electrodes 12, 13 sandwiching a respective first piezoelectric layer 14 on the first membrane 10. In other or further embodiments, the first electrode 11 covers a central area r/R between 0 and r1 of the first membrane 10, and the piezoelectric electrode 12 covers a peripheral area r/R between r1 and r2 of the first membrane 10 surrounding the central area. The first piezoelectric layer (not shown) can be limited to the peripheral area or be a continuous layer. e.g. when both piezoelectric electrodes 12, 13 are exclusively disposed sandwiching the peripheral area of the first piezoelectric layer 14.

Figure 7C:
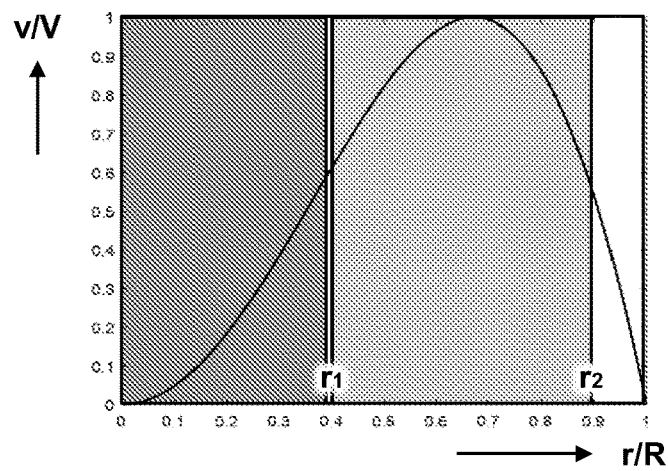
FIG. 7C illustrates relative volume displacement at resonance as a function of relative electrode radius for the piezoelectric layer.

FIG. 7C illustrates relative volume displacement v/V at resonance as function of relative electrode radius r/R for the piezoelectric layer. As illustrated, a more significant displacement is induced by parts of the piezoelectric layer and/or the piezoelectric electrodes disposed in a band around the center, e.g. between 0.4 and 0.9 times the radius R. Advantageously, the center can be covered by the first electrode 11 for electrostatic interaction without losing much of the piezoelectric function. In a preferred embodiment, the central area covered by the first electrode 11 is disposed between a center of the first membrane 10 up to a first radial distance r1 from the center, and the peripheral area covered by the piezoelectric electrode 12 is disposed outside the first radial distance r1, e.g. up to a second radial distance r2, wherein the first radial distance r1 is between 0.2 and 0.7 times the radius R of the membrane, preferably between 0.3 and 0.6, most preferably less than half the radius <0.5R, e.g. 0.4R as shown. In another or further embodiment, the second radial distance r2 is between 0.7 and 1 times the radius R of the membrane, e.g. up to 0.9R. In some embodiments, the central area covered by the first electrode 11 is relatively stiff and/or thick compared to the surrounding area. For example, the electrostatic interaction may be improved (exert over the whole area) if the central region stay relatively flat during the vibration.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. An ultrasonic transducer comprising:
a stack of at least two membranes attached to a substrate, wherein a first membrane and a second membrane of the at least two membranes are separated by a spacing there between, wherein the substrate surrounds the stack in a plane of the membranes; wherein the first membrane in the stack is parallel and facing the second membrane in the stack, wherein the first membrane and the second membrane are configured to vibrate at an ultrasonic frequency for transceiving ultrasonic waves, and wherein the first membrane and the second membrane each comprise a set of electrodes;
an electric circuit coupled to the set of electrodes with a controller configured to apply a first electric signal to a first electrode on the first membrane, and a different, second electric signal to a second electrode on the second membrane; wherein the first electric signal and the second electric signal are configured to apply a varying voltage between the first electrode and the second electrode during a respective vibration cycle of the membranes at the ultrasonic frequency; and wherein the first electrode on the first membrane is configured to interact with the second electrode on the second membrane by a varying electrostatic force during the respective vibration cycle depending on the varying voltage.

2. The ultrasonic transducer according to claim 1, wherein the controller is configured to apply a first voltage between the first electrode and the second electrode during a first half of the respective vibration cycle, and a second voltage between the first electrode and the second electrode during a second half of the respective vibration cycle, wherein the second voltage is higher than the first voltage.

3. The ultrasonic transducer according to claim 2, wherein controller is configured to apply, by variation in the varying voltage, an attractive electrostatic force between the first electrode and the second electrode only during the second half of the respective vibration cycle.

4. The ultrasonic transducer according to claim 3, wherein the attractive electrostatic force is exclusively applied during the second half of the respective vibration cycle when the first membrane moves in one direction, and not during the first half when the first membrane moves in an opposite direction of the one direction.

5. The ultrasonic transducer according to claim 1, wherein at least one of the first membrane and the second membrane comprises a respective piezoelectric layer sandwiched by a respective set of electrodes to transceive piezoelectric signals in accordance with the respective vibration cycle, wherein the piezoelectric signals are configured to generate a respective piezoelectric force on a respective at least one of the first membrane and the second membrane.

6. The ultrasonic transducer according to claim 1, wherein the electric circuit is configured to apply sets of electrical signals to respective sets of electrodes causing the first membrane and the second membrane to vibrate in unison by moving in a same direction at a same time.

7. The ultrasonic transducer according to claim 1, wherein a first set of piezoelectric signals is applied to a first set of electrodes on the first membrane to cause a varying voltage across a first piezoelectric layer on the first membrane, and a second set of piezoelectric signals is applied to a second set of electrodes on second membrane to cause a varying voltage across a second piezoelectric layer on the second membrane, wherein the varying voltage across the first piezoelectric layer is in phase with the varying voltage across a second piezoelectric layer, or in counter-phase.

8. The ultrasonic transducer according to claim 1, wherein a first set of piezoelectric signals to a first piezoelectric layer on the first membrane is configured to generate a first piezoelectric force in a same direction as the electrostatic force during a second half of the respective vibration cycle.

9. The ultrasonic transducer according to claim 8, wherein the first piezoelectric force and the electrostatic forces, in combination, cause an increased first amplitude of the first membrane compared to a second amplitude of the second membrane.

10. The ultrasonic transducer according to claim 1, wherein the first electrode on the first membrane, which is configured to interact with the second electrode on the second membrane by the varying electrostatic force, is also one of a first set of piezo electrodes sandwiching a first piezoelectric layer on the first membrane.

11. The ultrasonic transducer according to claim 1, wherein each of the first membrane and the second membrane comprises a first flexible foil and a second flexible foil, respectively, with a stack of layers including the respective first electrode and second electrode, wherein the first membrane and the second membrane are adhered to respective substrate layers of the substrate with an intermediate substrate layer disposed between the first flexible foil and the second flexible foil to form the spacing there between, wherein the ultrasonic transducer is formed at an opening in the substrate layers.

12. The ultrasonic transducer according to claim 1, wherein the first membrane and the second membrane each have a relatively thick or stiff section at a center compared to an edge.

13. The ultrasonic transducer according to claim 1, wherein the first membrane comprises:
a first area of conductive material forming the first electrode for electrostatic interaction with the second electrode on the second membrane; and
a second area of conductive material, adjacent the first area, forming a piezoelectric electrode of a set of piezoelectric electrodes sandwiching a respective first piezoelectric layer on the first membrane.

14. The ultrasonic transducer according to claim 13, wherein the first electrode covers a central area of the first membrane, and wherein the piezoelectric electrode covers a peripheral area of the first membrane surrounding the central area, wherein the central area covered by the first electrode is disposed between a center of the first membrane up to a first radial distance from the center, and the peripheral area covered by the piezoelectric electrode is disposed outside the first radial distance, and wherein the first radial distance is less than half a radius of the first membrane.

15. A method of controlling an ultrasonic transducer comprising a first membrane and a second membrane of a stack of at least two membranes attached to a substrate, wherein the first membrane and the second membrane are separated by a spacing there between,
wherein the substrate surrounds the stack in plane of the membranes;
wherein the first membrane in the stack is parallel and facing the second membrane in the stack,
wherein the membranes are configured to vibrate at an ultrasonic frequency for transceiving ultrasonic waves,
wherein each membrane comprises a set of electrodes,
wherein the method comprises applying a first electric signal to a first electrode on the first membrane, and a different, second electric signal to a second electrode on the second membrane;
wherein the first electric signal and the second electric signal are configured to apply a varying voltage between the first electrode and the second electrode during a respective vibration cycle of the first membrane and the second membrane at the ultrasonic frequency;
wherein the first electrode on the first membrane is configured to interact with the second electrode on the second membrane by a varying electrostatic force during the respective vibration cycle depending on the varying voltage.

16. The method of claim 15, comprising:
applying a first voltage between the first electrode and the second electrode during a first half of the respective vibration cycle, and
applying a second voltage between the first and second electrodes during a second half of the respective vibration cycle,
wherein the second voltage is higher than the first voltage.

17. The method of claim 16, comprising applying, by the variation in voltage, an attractive electrostatic force between the first electrode and the second electrode only during the second half of the respective vibration cycle.

18. The method of claim 17, wherein the attractive electrostatic force is exclusively applied during the second half of the respective vibration cycle when the first membrane moves in one direction, and not during the first half when the first membrane moves in an opposite direction of the one direction.

19. The method of claim 15, wherein sets of electrical signals are applied to respective sets of electrodes causing the first membrane and the second membrane to vibrate in unison moving in a same direction at a same time.

20. The method of claim 15, wherein a first set of piezoelectric signals is applied to a first piezoelectric layer on the first membrane to generate a first piezoelectric force in a same direction as the electrostatic force during a second half of the respective vibration cycle, wherein the first piezoelectric force and the electrostatic forces, combined, cause an increased first amplitude of the first membrane compared to a second amplitude of the second membrane.

* * * * *